(12) United States Patent
Patel et al.

(10) Patent No.: US 12,112,040 B2
(45) Date of Patent: Oct. 8, 2024

(54) DATA MOVEMENT INTIMATION USING INPUT/OUTPUT (I/O) QUEUE MANAGEMENT

(71) Applicant: International Business Machines Corporation, Armonk, NY (US)

(72) Inventors: Kushal S. Patel, Pune (IN); Subhojit Roy, Pune (IN); Ankur Srivastava, Pune (IN); Sarvesh S. Patel, Pune (IN)

(73) Assignee: International Business Machines Corporation, Armonk, NY (US)

( * ) Notice: Subject to any disclaimer, the term of this patent is extended or adjusted under 35 U.S.C. 154(b) by 25 days.

(21) Appl. No.: 17/403,673

(22) Filed: Aug. 16, 2021

(65) Prior Publication Data
US 2023/0051781 A1 Feb. 16, 2023

(51) Int. Cl.
*G06F 12/00* (2006.01)
*G06F 3/06* (2006.01)
*G06F 13/00* (2006.01)

(52) U.S. Cl.
CPC .......... *G06F 3/0611* (2013.01); *G06F 3/0604* (2013.01); *G06F 3/0644* (2013.01); *G06F 3/0659* (2013.01); *G06F 3/067* (2013.01)

(58) Field of Classification Search
CPC .... G06F 3/0611; G06F 3/0604; G06F 3/0644; G06F 3/0659; G06F 3/067
USPC ........................................................ 711/154
See application file for complete search history.

(56) References Cited

U.S. PATENT DOCUMENTS

| 4,398,272 | A | * | 8/1983 | Sibert | G01V 1/44 367/33 |
| 4,443,663 | A | * | 4/1984 | Ellis | H04Q 11/0407 379/284 |
| 4,447,673 | A | * | 5/1984 | Elliott | H04Q 11/0407 379/253 |
| 4,451,702 | A | * | 5/1984 | Brightman | H04M 19/026 379/280 |

(Continued)

OTHER PUBLICATIONS

Anonymous, "Method and System for Employing Non-Volatile Memory express (NVMe) Queues Usage for Data Patterns Hinting," Prior Art Database, Technical Disclosure No. IPCOM000256580D, Dec. 12, 2018, 3 pages.

(Continued)

*Primary Examiner* — Sheng Jen Tsai
(74) *Attorney, Agent, or Firm* — Zilka-Kotab, P.C.

(57) ABSTRACT

A computer-implemented method according to one embodiment includes causing a plurality of I/O queues to be created between an initiator and a storage target device. The created I/O queues are reserved for I/O requests for which adjustments of current priorities of extents of data associated with the I/O requests are to be performed. The method further includes determining identifying information of an I/O request sent from the initiator to the storage target device and determining whether the I/O request was sent from the initiator to the storage target device using one of the created I/O queues. In response to a determination that the I/O request was sent using a first of the created I/O queues having one of the adjustments associated therewith, a tiering manager of the storage target device is instructed to perform the adjustment on the current priority of the extent of data associated with the I/O request.

20 Claims, 8 Drawing Sheets

(56) References Cited

U.S. PATENT DOCUMENTS

| | | | | |
|---|---|---|---|---|
| 4,471,169 A * | 9/1984 | Lenk | H04M 19/026 | 379/253 |
| 4,475,011 A * | 10/1984 | Brightman | H04Q 11/0407 | 379/253 |
| 4,479,034 A * | 10/1984 | Brightman | H04M 19/026 | 379/255 |
| 4,555,595 A * | 11/1985 | Brightman | H04Q 11/0407 | 379/284 |
| 5,220,653 A * | 6/1993 | Miro | G06F 3/0601 | 719/321 |
| 5,404,550 A * | 4/1995 | Horst | G06F 15/8015 | 712/14 |
| 5,440,686 A * | 8/1995 | Dahman | G11B 27/002 | 711/158 |
| 5,634,004 A * | 5/1997 | Gopinath | G06F 15/17375 | 710/317 |
| 6,457,101 B1 * | 9/2002 | Bauman | G06F 12/0817 | 711/143 |
| 6,590,901 B1 * | 7/2003 | Jones | H04L 47/2441 | 370/428 |
| 6,738,386 B1 * | 5/2004 | Holmqvist | H04L 47/30 | 370/428 |
| 6,798,768 B1 * | 9/2004 | Gallick | H04L 65/1096 | 370/401 |
| 6,882,641 B1 * | 4/2005 | Gallick | H04M 3/5191 | 370/252 |
| 10,671,431 B1 * | 6/2020 | Dolan | G06F 3/0649 | |
| 10,713,180 B2 * | 7/2020 | Chachad | G06F 12/0246 | |
| 2003/0018738 A1 * | 1/2003 | Boylan | G06F 30/30 | 709/213 |
| 2010/0131671 A1 * | 5/2010 | Kohli | H04L 65/762 | 709/233 |
| 2011/0295628 A1 * | 12/2011 | Priyadarshan | G06Q 30/02 | 709/224 |
| 2012/0275391 A1 * | 11/2012 | Cui | H04W 72/566 | 370/329 |
| 2013/0247056 A1 * | 9/2013 | Hattori | G06F 9/5077 | 718/102 |
| 2014/0115256 A1 * | 4/2014 | Liu | G06F 12/0897 | 711/E12.024 |
| 2015/0095282 A1 * | 4/2015 | Jones | H04L 67/1008 | 707/624 |
| 2015/0138667 A1 * | 5/2015 | Yamamoto | G06F 3/0653 | 360/49 |
| 2015/0220463 A1 * | 8/2015 | Fluman | G06F 3/061 | 711/158 |
| 2015/0382062 A1 * | 12/2015 | Sivaraman | H04N 21/4622 | 725/50 |
| 2016/0063655 A1 * | 3/2016 | Piconi | G06Q 50/20 | 705/326 |
| 2016/0231928 A1 * | 8/2016 | Lewis | G06F 3/0638 | |
| 2018/0018379 A1 * | 1/2018 | Eda | G06F 16/185 | |
| 2018/0136838 A1 * | 5/2018 | White | G06F 3/0647 | |
| 2020/0042236 A1 * | 2/2020 | Subraya | G06F 9/45533 | |
| 2020/0319813 A1 * | 10/2020 | Mittal | G06F 3/0658 | |
| 2021/0006513 A1 * | 1/2021 | Gafni | H04L 47/805 | |
| 2021/0048947 A1 * | 2/2021 | Frolikov | G06F 3/061 | |
| 2021/0073086 A1 * | 3/2021 | Bannur Subraya | G06F 11/3476 | |
| 2021/0144517 A1 * | 5/2021 | Guim Bernat | H04L 41/0869 | |
| 2022/0164300 A1 * | 5/2022 | Wu | G06F 12/0238 | |

OTHER PUBLICATIONS

Kougkas et al., "I/O Acceleration via Multi-Tiered Data Buffering and Prefetching," Journal of Computer Science and Technology, vol. 35, No. 1, Jan. 2020, 32 pages.

* cited by examiner

DATA MOVEMENT INTIMATION USING INPUT/OUTPUT (I/O) QUEUE MANAGEMENT

BACKGROUND

The present invention relates to tiered data storage systems, and more specifically, this invention relates to data movement within a tiered data storage systems based on I/O queue management.

Nonvolatile Memory express (NVMe) is a storage protocol that is designed for quick data transfer between servers, storage devices and flash controllers that typically use Peripheral Component Interconnect Express (PCIe) bus. The specification of NVMe provides a register interface and a command set that enables relatively high performance I/O. This is an alternative to the traditional Small Computer System Interface (SCSI) standards, and other standards, e.g., such as Statistical Analysis System (SAS), serial advanced technology attachment (SATA), etc., for data transmission across a hosts and storage systems. One of the primary advantages of NVMe-based PCIe Flashover SAS and SATA-based solid state drives (SSDs) is reduced latency of access in the host software stack, which leads to higher input/output operations per second (IOPS) and lower central processing unit (CPU) utilization.

NVMe supports parallel I/O processing with multicore servers. This results in relatively fast I/O dispensation which leads to reduction in I/O latency. Because there are multiple cores that are processing I/O requests simultaneously in such a protocol, system performance increases due to efficient utilization of CPU resources. Additionally, NVMe is designed with the expectation of fewer CPU instructions per I/O. For context, NVMe also supports 64,000 commands in a single message queue and a maximum of 65,535 I/O queues.

SUMMARY

A computer-implemented method according to one embodiment includes causing a plurality of I/O queues to be created between an initiator and a storage target device. The created I/O queues are reserved for I/O requests for which adjustments of current priorities of extents of data associated with the I/O requests are to be performed. The method further includes determining identifying information of an I/O request sent from the initiator to the storage target device and determining, using the identifying information, whether the I/O request was sent from the initiator to the storage target device using one of the created I/O queues. In response to a determination that the I/O request was sent from the initiator to the storage target device using a first of the created I/O queues having one of the adjustments associated therewith, a tiering manager of the storage target device is instructed to perform the adjustment on the current priority of the extent of data associated with the I/O request.

A computer program product according to another embodiment includes a computer readable storage medium having program instructions embodied therewith. The program instructions are readable and/or executable by a computer to cause the computer to perform the foregoing method.

A system according to another embodiment includes a processor, and logic integrated with the processor, executable by the processor, or integrated with and executable by the processor. The logic is configured to perform the foregoing method.

Other aspects and embodiments of the present invention will become apparent from the following detailed description, which, when taken in conjunction with the drawings, illustrate by way of example the principles of the invention.

DETAILED DESCRIPTION

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The following description discloses several preferred embodiments of data movement intimation using I/O queue management.

In one general embodiment, a computer-implemented method includes causing a plurality of I/O queues to be created between an initiator and a storage target device. The created I/O queues are reserved for I/O requests for which adjustments of current priorities of extents of data associated with the I/O requests are to be performed. The method further includes determining identifying information of an I/O request sent from the initiator to the storage target device and determining, using the identifying information, whether the I/O request was sent from the initiator to the storage target device using one of the created I/O queues. In response to a determination that the I/O request was sent from the initiator to the storage target device using a first of the created I/O queues having one of the adjustments associated therewith, a tiering manager of the storage target device is instructed to perform the adjustment on the current priority of the extent of data associated with the I/O request.

In another general embodiment, a computer program product includes a computer readable storage medium having program instructions embodied therewith. The program instructions are readable and/or executable by a computer to cause the computer to perform the foregoing method.

In another general embodiment, a system includes a processor, and logic integrated with the processor, executable by the processor, or integrated with and executable by the processor. The logic is configured to perform the foregoing method.

Figure 1:
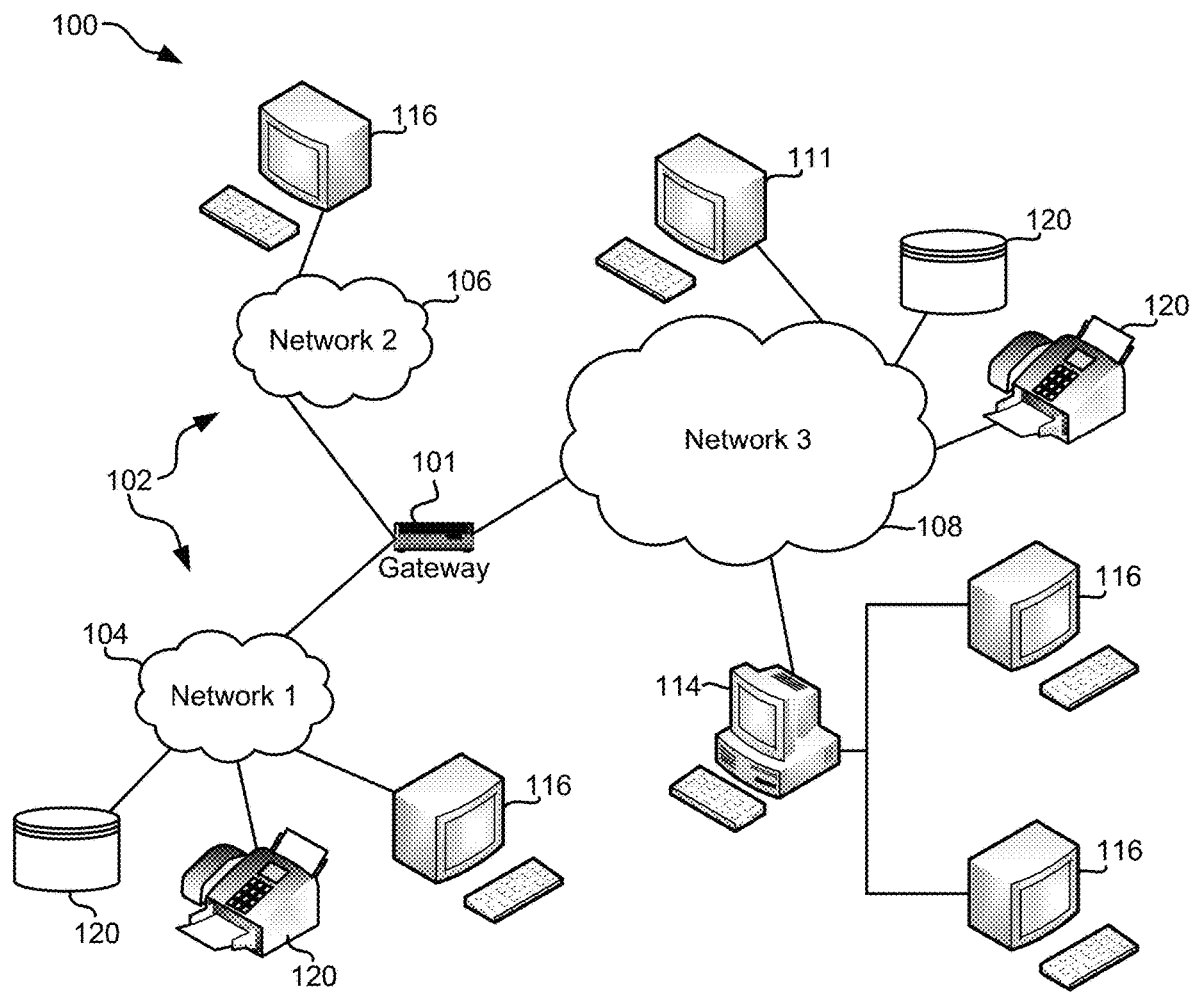
FIG. 1 is a diagram of a network architecture, in accordance with one embodiment.

FIG. 1 illustrates an architecture 100, in accordance with one embodiment. As shown in FIG. 1, a plurality of remote networks 102 are provided including a first remote network 104 and a second remote network 106. A gateway 101 may be coupled between the remote networks 102 and a proximate network 108. In the context of the present architecture 100, the networks 104, 106 may each take any form including, but not limited to a local area network (LAN), a wide area network (WAN) such as the Internet, public switched telephone network (PSTN), internal telephone network, etc.

In use, the gateway 101 serves as an entrance point from the remote networks 102 to the proximate network 108. As such, the gateway 101 may function as a router, which is capable of directing a given packet of data that arrives at the gateway 101, and a switch, which furnishes the actual path in and out of the gateway 101 for a given packet.

Further included is at least one data server 114 coupled to the proximate network 108, and which is accessible from the remote networks 102 via the gateway 101. It should be noted that the data server(s) 114 may include any type of computing device/groupware. Coupled to each data server 114 is a plurality of user devices 116. User devices 116 may also be connected directly through one of the networks 104, 106, 108. Such user devices 116 may include a desktop computer, lap-top computer, hand-held computer, printer or any other type of logic. It should be noted that a user device 111 may also be directly coupled to any of the networks, in one embodiment.

A peripheral 120 or series of peripherals 120, e.g., facsimile machines, printers, networked and/or local storage units or systems, etc., may be coupled to one or more of the networks 104, 106, 108. It should be noted that databases and/or additional components may be utilized with, or integrated into, any type of network element coupled to the networks 104, 106, 108. In the context of the present description, a network element may refer to any component of a network.

According to some approaches, methods and systems described herein may be implemented with and/or on virtual systems and/or systems which emulate one or more other systems, such as a UNIX® system which emulates an IBM® z/OS® environment (IBM and all IBM—based trademarks and logos are trademarks or registered trademarks of International Business Machines Corporation and/or its affiliates), a UNIX® system which virtually hosts a known operating system environment, an operating system which emulates an IBM® z/OS® environment, etc. This virtualization and/or emulation may be enhanced through the use of VMware® software, in some embodiments.

In more approaches, one or more networks 104, 106, 108, may represent a cluster of systems commonly referred to as a "cloud." In cloud computing, shared resources, such as processing power, peripherals, software, data, servers, etc., are provided to any system in the cloud in an on-demand relationship, thereby allowing access and distribution of services across many computing systems. Cloud computing typically involves an Internet connection between the systems operating in the cloud, but other techniques of connecting the systems may also be used.

Figure 2:
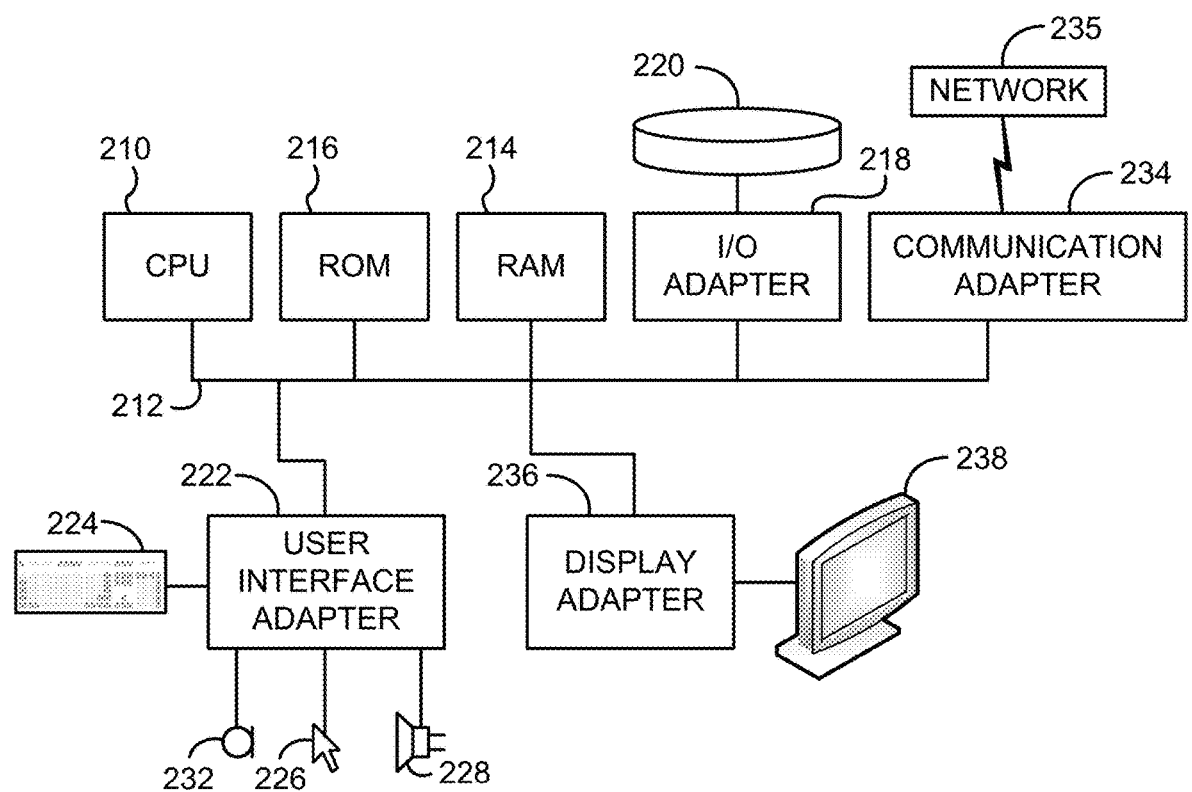
FIG. 2 is a diagram of a representative hardware environment that may be associated with the servers and/or clients of FIG. 1, in accordance with one embodiment.

FIG. 2 shows a representative hardware environment associated with a user device 116 and/or server 114 of FIG. 1, in accordance with one embodiment. Such figure illustrates a typical hardware configuration of a workstation having a central processing unit 210, such as a microprocessor, and a number of other units interconnected via a system bus 212.

The workstation shown in FIG. 2 includes a Random Access Memory (RAM) 214, Read Only Memory (ROM) 216, an input/output (I/O) adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen and a digital camera (not shown) to the bus 212, communication adapter 234 for connecting the workstation to a communication network 235 (e.g., a data processing network) and a display adapter 236 for connecting the bus 212 to a display device 238.

The workstation may have resident thereon an operating system such as the Microsoft Windows® Operating System (OS), a macOS®, a UNIX® OS, etc. It will be appreciated that a preferred embodiment may also be implemented on platforms and operating systems other than those mentioned. A preferred embodiment may be written using eXtensible Markup Language (XML), C, and/or C++ language, or other programming languages, along with an object oriented programming methodology. Object oriented programming (OOP), which has become increasingly used to develop complex applications, may be used.

Figure 3:
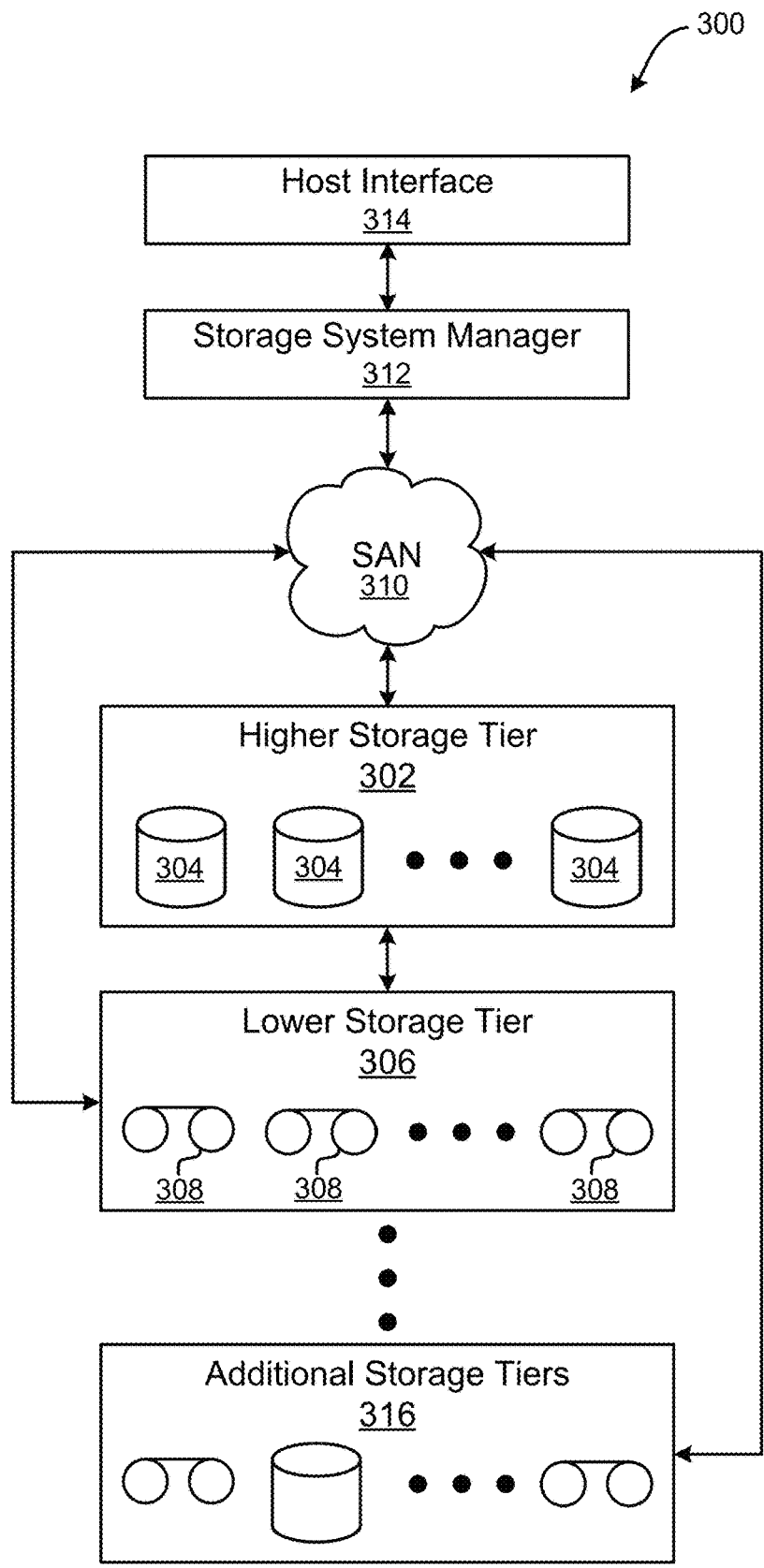
FIG. 3 is a diagram of a tiered data storage system, in accordance with one embodiment.

Now referring to FIG. 3, a storage system 300 is shown according to one embodiment. Note that some of the elements shown in FIG. 3 may be implemented as hardware and/or software, according to various embodiments. The storage system 300 may include a storage system manager 312 for communicating with a plurality of media and/or drives on at least one higher storage tier 302 and at least one lower storage tier 306. The higher storage tier(s) 302 preferably may include one or more random access and/or direct access media 304, such as hard disks in hard disk drives (HDDs), nonvolatile memory (NVM), solid state memory in solid state drives (SSDs), flash memory, SSD arrays, flash memory arrays, etc., and/or others noted herein or known in the art. The lower storage tier(s) 306 may preferably include one or more lower performing storage media 308, including sequential access media such as magnetic tape in tape drives and/or optical media, slower accessing HDDs, slower accessing SSDs, etc., and/or others noted herein or known in the art. One or more additional storage tiers 316 may include any combination of storage memory media as desired by a designer of the system 300. Also, any of the higher storage tiers 302 and/or the lower storage tiers 306 may include some combination of storage devices and/or storage media.

The storage system manager 312 may communicate with the drives and/or storage media 304, 308 on the higher storage tier(s) 302 and lower storage tier(s) 306 through a network 310, such as a storage area network (SAN), as shown in FIG. 3, or some other suitable network type. The storage system manager 312 may also communicate with one or more host systems (not shown) through a host interface 314, which may or may not be a part of the storage system manager 312. The storage system manager 312 and/or any other component of the storage system 300 may be implemented in hardware and/or software, and may make use of a processor (not shown) for executing commands of a type known in the art, such as a central processing unit (CPU), a field programmable gate array (FPGA), an application specific integrated circuit (ASIC), etc. Of course, any arrangement of a storage system may be used, as will be apparent to those of skill in the art upon reading the present description.

In more embodiments, the storage system 300 may include any number of data storage tiers, and may include the same or different storage memory media within each storage tier. For example, each data storage tier may include the same type of storage memory media, such as HDDs, SSDs, sequential access media (tape in tape drives, optical disc in optical disc drives, etc.), direct access media (CD-ROM, DVD-ROM, etc.), or any combination of media storage types. In one such configuration, a higher storage tier 302, may include a majority of SSD storage media for storing data in a higher performing storage environment, and remaining storage tiers, including lower storage tier 306 and additional storage tiers 316 may include any combination of SSDs, HDDs, tape drives, etc., for storing data in a lower performing storage environment. In this way, more frequently accessed data, data having a higher priority, data needing to be accessed more quickly, etc., may be stored to the higher storage tier 302, while data not having one of these attributes may be stored to the additional storage tiers 316, including lower storage tier 306. Of course, one of skill in the art, upon reading the present descriptions, may devise many other combinations of storage media types to implement into different storage schemes, according to the embodiments presented herein.

According to some embodiments, the storage system (such as 300) may include logic configured to receive a request to open a data set, logic configured to determine if the requested data set is stored to a lower storage tier 306 of a tiered data storage system 300 in multiple associated portions, logic configured to move each associated portion of the requested data set to a higher storage tier 302 of the tiered data storage system 300, and logic configured to assemble the requested data set on the higher storage tier 302 of the tiered data storage system 300 from the associated portions.

Of course, this logic may be implemented as a method on any device and/or system or as a computer program product, according to various embodiments.

As mentioned elsewhere herein, NVMe is a storage protocol that is designed for quick data transfer between servers, storage devices and flash controllers that typically use PCIe bus. The specification of NVMe provides a register interface and a command set that enables relatively high performance I/O. This is an alternative to the traditional SCSI standards, and other standards, e.g., such as SAS, SATA, etc., for data transmission across a hosts and storage systems. One of the primary advantages of NVMe-based PCIe Flashover SAS and SATA-based SSDs is reduced latency of access in the host software stack, which leads to higher IOPS and lower CPU utilization.

NVMe supports parallel I/O processing with multicore servers. This results in relatively fast I/O dispensation which leads to reduction in I/O latency. Because there are multiple cores that are processing I/O requests simultaneously in such a protocol, system performance increases due to efficient utilization of CPU resources. Additionally, NVMe is designed with the expectation of fewer CPU instructions per I/O. For context, NVMe also supports 64,000 commands in a single message queue and a maximum of 65,535 I/O queues.

NVMe over Fabrics (NVMe-oF) is an extension to local PCIe NVMe that allows benefits of NVMe, like high-performance and low-latency across network fabrics. Servers and storage devices can be connected over Ethernet network or Fibre Channel, and both of these interconnects support NVMe commands over the fabric that extends the advantages of NVMe protocol to interconnected system components. A design goal for NVMe-oF was to add no more than ten microseconds of latency for communication between an NVMe host computer and a network-connected NVMe storage devices, on top of the latency associated with accessing PCIe NVMe storage.

With reference now to architectures of I/O queues, NVMe-oF supports multiple I/O queues for regular I/O operation from a host to storage systems. A maximum of about 65000 queues are supported by NVMe, with about 64000 entries in each queue. A host driver is relied on to create queues once a connection is established between a host and a storage system. For example, once the host is connected to a target system device, a special-purpose queue may be created upon association, e.g., admin queue. As the name suggests, the admin queue may be used to transfer control commands from an initiator to the storage target device of the storage system. Once the admin queue is created, it may be used by a host to create I/O queues based on system requirements. The host may establish multiple I/O queues to a single controller with the same NVMe Qualified Name (NQN) and have multiple namespaces, or volumes, mapped to it. Once I/O queues are established, I/O commands may be submitted to the I/O submission queue (SQ), and I/O responses may be collected from a completion queue (CQ). These I/O queues may be added or removed using control instructions sent via the admin queue for that session.

Figure 4:
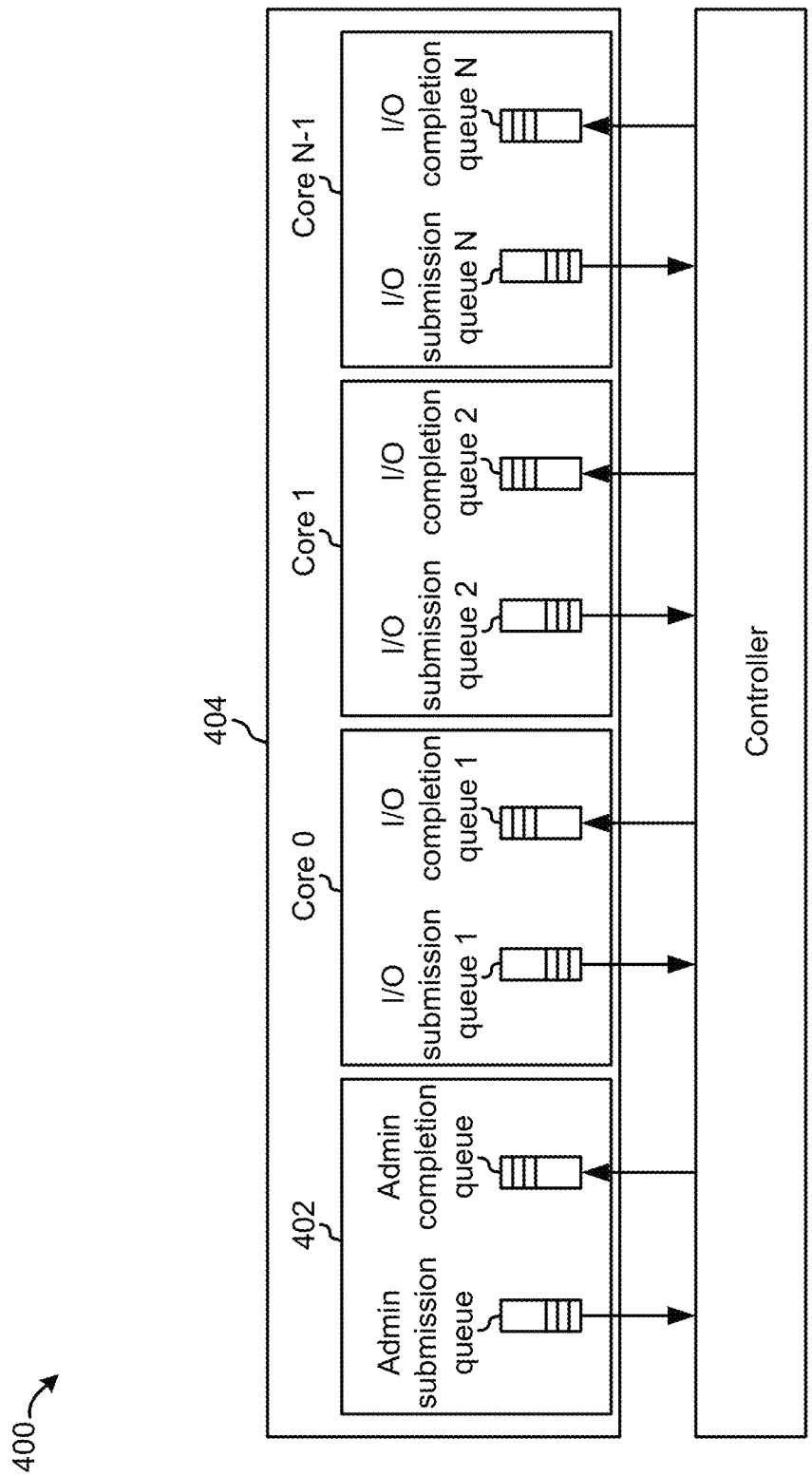
FIG. 4 is a lossless architecture of a storage environment, in accordance with one embodiment.

Upon a command being received by the storage target device from an initiator for I/O queue creation, the storage target device performs initial system checks for a maximum number of supported queues and other relevant fields. The storage target device also creates an I/O queue and assigns the I/O queue to a CPU core on a storage controller of the target. Once completed, a response to the queue creation request is returned via the admin completion queue. Each I/O queue is assigned to different CPU cores on the storage controller. This allows parallelism and boosts throughput of the system. Core assignment logic is implemented at the target storage controller and I/O queue to core mapping is performed based on a predefined policy at the storage controller. For contextual purposes, reference is now made to lossless architecture 400 of FIG. 4, which includes a plurality of I/O queue pairings. For example, storage system 404 includes a management queue 402 having a queue pair that includes a submission queue and a completion queue, e.g., see Admin submission queue and Admin completion queue, that is created first. Storage system 404 further includes three created I/O queues that are bound to different cores, e.g., see Core 0, Core 1 and Core N−1, at the target. The architecture 400 is a lossless architecture because as different I/O queues are bound to different CPU cores, there is no requirement of locking and unlocking the CPU cores.

In some conventional multi-tiered storage systems, data is stored on various types of storage devices primarily based on criteria of the access, frequency of use, and data recovery requirements. For example, data that is accessed relatively frequently by an application that is response time sensitive may be stored on SSDs. Other data that is accessed relatively infrequently, and for which a higher response time is more acceptable may be stored on high capacity 7.2K RPM drives. One reason for such a storage protocol is based on the fact that the cost per gigabyte of SSD storage is significantly more expensive than the cost per gigabyte of storage of the 7.2K RPM drives. Some conventional tiering systems include an extent heat map which count, e.g., using extent access temperature counters, a number of I/O accesses that are made to extents of data. In instances in which I/O reaches to the storage system, the extent access temperature counters are increased before serving the I/O which will be used to make the tiering decisions. At the time of a tiering cycle, access heats for each extent in the storage pool are measured, and as a result, extent placement decisions are taken. For example, extents of data that have been accessed relatively more frequently within the most recently elapsed predetermined time interval, e.g., such as a twenty-four hour tiering cycle, are moved to a fast performing tier of the data storage system, while in contrast, extents of data that have been accessed relatively less frequently within the most recently elapsed tiering cycle are moved to a middle or slow performing tier of the data storage system. This movement of data is likely to result in a relatively more efficient utilization of storage space, e.g., quicker fulfillment of I/O requests, assuming that I/O requests received in the following predefined amount of time do not predominantly request data from the middle and/or a slower performing tier instead of the faster performing tier of the data storage system.

One challenge in effectively using a multi-tiered storage system is identifying data that benefits from placement in higher cost/higher performance storage tiers. This is because, overtime, the candidacy for a given extent of data in relatively higher performing storage tiers or relatively lower performing storage tiers may change. Accordingly, the identification and movement of data to an appropriate tier is an ongoing process.

With continued reference to some conventional multi-tier storage systems, extents of data are moved to faster performing when the data extents in the storage pool experience a certain amount of access to the data. These access heat counters are measured per I/O basis and thresholds are usually defined in a static file which are used for comparison of access heats of extents of data while promotion and demotion decisions are performed. A case in which the host is accessing the data from the storage controller volumes that are allocated to it may be considered. When the application starts accessing the data, the access heat measurement system at the tiering daemon updates the access heat counters on each I/O and may detect that the data is being relatively frequently accessed. Where the extent is present at the slower performing tier, the extent may be moved to a relatively faster tier storage in response to a determination that the extent is accessed relatively frequently, e.g., such a determination may be made once a most recent tiering cycle ends. Until the tiering cycle ends, all I/O requests for the extent are served from the slower tier, which results in a relatively higher latency experience. In many cases, when an application begins accessing the data for some time, until the application needs the data, the requested data is located at relatively slower tier location, and as a result, the user experiences latency. In some situations, this latency may be mitigated once the data is moved to the faster tier space. However, in some other situations in which the data is not moved to the relatively faster tier space until the current tiering cycle expires, this latency may continue to be experienced where the data is moved to the relatively faster tier space after an application no longer calls for the data. This movement of the data instead decreases the processing performance of the multi-tiered storage system based on data that the application does not call for, or relatively rarely calls for, occupying high cost/high performance storage space of the relatively faster storage tier. Further, customers never experienced reduced latency benefit of the data being in the faster storage tier because the application use occurred while the data was in the slower storage tier. This is particularly concerning in cases where customers are paying more than other customers for faster storage, as the customers that are paying more have application accesses performed from tiers with higher latency storage.

According to a more specific example, assume that a data storage system has a twenty-four hour tiering cycle that expires at 10:45 AM each day, and assume that an application, e.g., application A, performs a data operation each day from 10:00 AM to 11:00 AM, in which data, e.g., "extent 3," is read from a current extent location which is a relatively slower tier, e.g., such as a HDD drive. It may also be assumed that there is no prior access made on this extent, and therefore extent 3 is resident at the relatively slower tier HDD drive. Upon it being realized, e.g., by logic of a tiering manager at the end of the tiering cycle, that extent 3 is frequently read, the data is moved to a relatively faster performing SSD tier in order to allow applications to benefit from the low latency, costly, faster tier space. However, the applications are only able to utilize this benefit for 15 minutes, e.g., based on the movement of data occurring at the end of the tiering cycle at 10:45 AM. Because of this, the capability and performance advantage of faster tier is not utilized properly. Accordingly, conventional multi-tiered storage systems do not include mechanisms that provide an in-band approach in NVMe I/O queue architecture. Further, there is no mechanism that uses existing I/O Queue architecture in NVMe to provide a storage controller hints for extent placement logic, and therefore storage controllers lack information about access patterns and time to promptly move extents of data among tiers. Instead, conventional NVMe I/O queues are created between a host and the storage system and there is no way by which these pre-created I/O queues can be used to hint the storage tiering daemon to move the extent to faster tier to achieve performance improvements. Moreover, techniques are not included in conventional NVMe protocol to provide hinting using I/O queue designation.

In sharp contrast to various conventional techniques described above which are prone to inefficient data placement within tiers of a multi-tiered storage system, various embodiment and approaches described herein utilize information that is sent using in-band NVMe I/O queue architecture for intimation, e.g., hinting, efficient placement of data extents across the tiers of a multi-tiered storage system.

Figure 5:
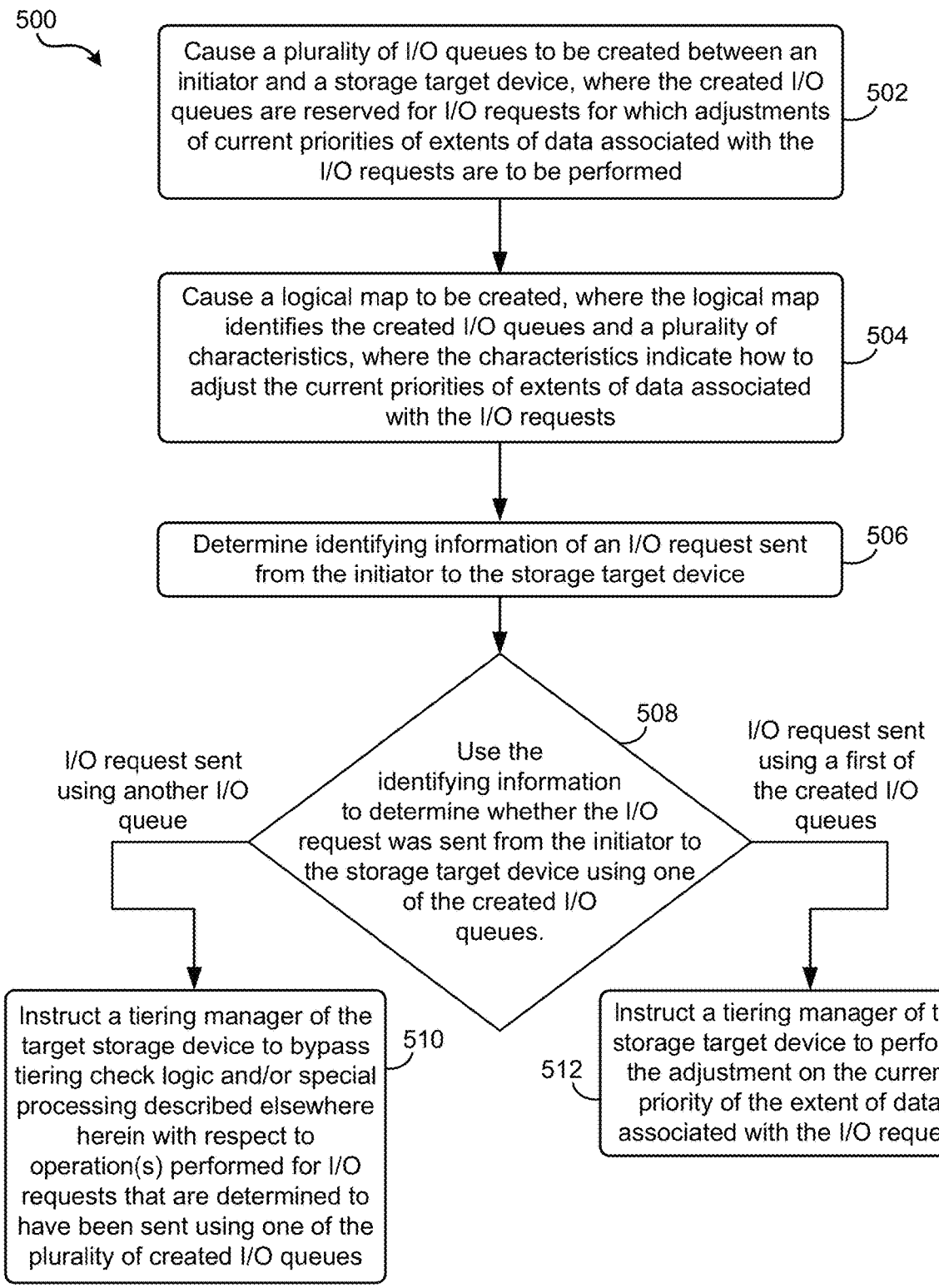
FIG. 5 is a flowchart of a method, in accordance with one embodiment.

Now referring to FIG. 5, a flowchart of a method 500 is shown according to one embodiment. The method 500 may be performed in accordance with the present invention in any of the environments depicted in FIGS. 1-6B and 7B, among others, in various embodiments. Of course, more or fewer operations than those specifically described in FIG. 5 may be included in method 500, as would be understood by one of skill in the art upon reading the present descriptions.

Each of the steps of the method 500 may be performed by any suitable component of the operating environment. For example, one or more of the operations included in method 500 may be performed by any computing component illustrated in FIGS. 6A-6B below. For instance, according to some approaches, one or more of the operations included in method 500 may be performed by a processor at a remote host location (e.g., see HOST of FIGS. 6A-6B). In various other approaches, one or more of the operations in method 500 may be performed by a NVMe driver, a tiering manager, etc., e.g., see FIG. 6B elsewhere below.

In other embodiments, the method 500 may be partially or entirely performed by a controller, or some other device having one or more processors therein. The processor, e.g., processing circuit(s), chip(s), and/or module(s) implemented in hardware and/or software, and preferably having at least one hardware component may be utilized in any device to perform one or more steps of the method 500. Illustrative processors include, but are not limited to, a central processing unit (CPU), an application specific integrated circuit (ASIC), a field programmable gate array (FPGA), etc., combinations thereof, or any other suitable computing device known in the art.

For context, it may be prefaced that a core idea of various embodiments and approaches described herein, e.g., such as method 500, may be to provide techniques that are implemented at a host and storage system level with an existing driver, e.g., an NVMe driver, I/O queue management, and a storage tiering daemon. Such techniques are implemented in order to manage extent heat and access counter mappings, and moreover provide an efficient way of creating special-purpose NVMe I/O queues between the host and the storage target system to use as dedicated hinting queues for block data storage. These special-purpose NVMe I/O queues are preferably created between the host and the storage system, and transfer a selected set of I/O read/write commands that are ultimately treated differently at the storage target controller in order to improve access efficiencies in a multi-tiered storage system. As will be described in greater detail elsewhere below, various embodiments and approaches described herein furthermore include a mechanism to tag the NVMe IO queue as a hinting I/O queue along with characteristics for performing adjustments on current priorities, e.g., access heat temperature increment, of extents of data associated with I/O request sent from the initiator to the storage target device using the special-purpose NVMe I/O queues. These parameters may be defined using a static configuration file and/or a user defined attribute which can be dynamically configurable, e.g., such as by storage administrators.

The initiator may be a host system, or any portion thereof, e.g., any portions of hosts systems described elsewhere herein. For example, in some approaches, the initiator may be a host system that includes NVMe-oF I/O queues and/or an I/O queue manager. Moreover, the storage target device may be a storage system, or any portion thereof, e.g., any portion of the storage systems described elsewhere herein. For example, in some approaches, the storage target device includes any one or more components, e.g., CPU cores, an NVMe driver, an I/O queue manager, a virtualization and I/O management stack, a plurality of different storage tiers having one or more types of storage media associated therewith, etc.

Operation 502 of method 500 includes causing a plurality of I/O queues, e.g., special-purpose NVMe I/O queues, to be created between an initiator and a storage target device. For context, in some preferred approaches, the created I/O queues are reserved for I/O requests for which adjustments of current priorities of extents of data associated with the I/O requests are to be performed. As described elsewhere herein, priority of extents of data that are managed according to a periodic tiering cycle may be inefficient in that, by the time that extents of data are migrated to a higher tier having relatively more processing resources, the data may no longer be of use to an application that requests them. Here however, by reserving the created I/O queues for I/O requests for which adjustments of current priorities of extents of data associated with the I/O requests are to be performed, extents of data that are migrated to the relatively faster performing data storage resources of higher storage tiers of the tiered data storage pool by the time that the extents of data are in-demand. This is because anticipated demands and/or lack of demands for extents of data are streamlined, e.g., via the adjustments, into current priorities of the extents of data by sending I/O requests for the extents of data using the created I/O queues. For example, as will be described in greater detail elsewhere below, where certain extents of data are determined, e.g., anticipated based on review by an application of previous data accesses, to be likely accessed relatively frequently in a predetermined future period of time, the created special-purpose hinting I/O queues are used to send the I/O requests between an initiator and a target. More specifically, extents of data that will yield a performance benefit as a result of being placed at the faster performing tier, e.g., the extents are needed in the near future, may be sent to the storage target using a PROMOTION_IOQ. In contrast, extents of data that will not yield a performance benefit as a result of remaining in the faster performing tier may be sent to the storage target using a DEMOTION_IOQ Applications that have different tiering thresholds for promotion and demotion of data may use special weightage I/O queues, e.g., SPECICAL_WEIGHTAGE, to send I/O requests to the storage target.

Anticipated demand and/or lack of demand for one or more extents of data may be based on various types of information. For example, a first of the created I/O queues may be used to send the I/O request from the initiator to the storage target device based on, e.g., past user information, scheduled data accesses, historical analytics, patters of access determined using a known pattern recognition technique, I/O queue decisions based on existing access counter maps, etc., which in some approaches may be collected by a driver of the host site, which may be an NVMe driver. In some approaches, anticipated demand and/or lack of demand for one or more extents of data may additionally and/or alternatively be based a determination of whether an extent of data that is in a predetermined tier is expected to be accessed and/or expected to not be accessed within a predetermined amount of time.

Various approaches described herein refer to in-band data movement within the storage tiers of the tiered data storage pool. For context, data storage typically include at least one initiator and one target that are different entities. Communication between an initiator and a target may be possible using one of two different communication mechanisms, e.g., out-of-band data movement and in-band data movement. In out-of-band communication mechanisms, one external governing entity communicates between both the initiator and the target, and the external governing entity is responsible for making the communication between the initiator and the target. This occurs based on external APIs and external message based communication exchange between the entities. In contrast, in-band based communication uses a protocol based communication approach where direct communication between the host and target occurs with existing protocol commands. Accordingly, various approaches described herein utilize NVMe based communication for intimating data movement based on I/O queue management. In order to manage such queues, during creation of the plurality of I/O queues, parameters are negotiated between the host and the storage system in order to provide knowledge, e.g., via a set of instructions to the target controller about a nature of the I/O queues. More specifically, a logical understanding, e.g., in-band protocol commands, that details how the I/O queues are to be managed may be established and provided to one or more components responsible for processing information and/or executing operations associated with use of the created plurality of I/O queues.

A thin layer of application instances may be implemented at the initiating host layer and that is used to keep track of special-purpose hinting I/O queues vs normal I/O transmission carrier queues. In some approaches this logical understanding may be defined by a logical map that is caused to be created in operation 504 of method 500. The logical map in some approaches identify the created I/O queues and a plurality of characteristics, e.g., such as the parameters negotiated between the host and the storage system. In some approaches, at a time that an I/O queue create request is received at the storage target device, a daemon at the host layer may determine the purpose of the I/O queue based on requirements and accordingly update the I/O queue logical map which may be maintained at a NVMe driver of the storage target device. The host daemon and NVMe driver preferably keeps the information about the characteristics of each I/O queue created between the host and storage system that will be further used to send the special data over the created queues when needed. The characteristics may also be stored in the logical map maintained at the storage target device. At least some of the characteristics indicates how to adjust current priorities of extents of data associated with I/O requests that are each sent from the initiator to the storage target device using one of the created I/O queues. Note that the I/O requests of a given type, e.g., promotion, demotion, weightage, etc., may be sent using a unique one of the created I/O queues. In contrast, in some approaches, one or more of the created I/O queues may be configured to send more than one type of the I/O requests, e.g., promotion, demotion, weightage, etc. In some approaches, the characteristics may indicate that extents of data associated with an I/O request sent from the initiator to the storage target device using a first of the created I/O queues are to be promoted. For context, examples of I/O requests that may be send using the created I/O queues include, e.g., a write operation that is to be performed on an extent of data, a read operation that is to be performed on an extent of data, an operation that uses the extent of data, etc. In another approach, the characteristics may additionally and/or alternatively indicate that extents of data associated with an I/O request sent from the initiator to the storage target device using a second of the created I/O queues are to be demoted. In yet another approach, the characteristics may additionally and/or alternatively indicate a current tiering weightage of a heat map of extents of data of the tiered data storage pool is to be updated in response to an I/O request being sent from the initiator to the storage target device using a third of the created I/O queues. Techniques to adjust current priorities of extents of data associated with I/O requests that are sent from the initiator to the storage target device using one of the created I/O queues will be described in greater detail elsewhere herein, e.g., see operation 512 of method 500.

Data, e.g., an I/O request, may be sent from the initiator to a NVMe driver of the storage target device. In order manage data priorities for efficient performance of the data storage system, it is preferably determined whether the I/O request is received from one of the created special-purpose hinting I/O queues. Operation 506 of method 500 includes determining identifying information of an I/O request sent from the initiator to the storage target device. The identifying information is preferably information of the I/O request that may be used to determine whether the I/O request was sent from the initiator to the storage target device using any of the created I/O queues, e.g., see decision 508 of method 500. In one preferred approach the identifying information is an identity (ID) of an I/O queue that was used to send the I/O request from the initiator to the storage target device. In such an approach, the ID of the I/O queue that was used to send the I/O request may be an ID of one of the created I/O queues, e.g., such as an ID number of the I/O queue, or an ID of another I/O queue. According to some other approaches, the identifying information may additionally and/or alternatively include a port number that is pre-associated with the created I/O queue used to send the I/O request from the initiator to the storage target device. According to some other approaches, the identifying information may additionally and/or alternatively include a known type of information encoded with a known type of encoding format, such as a flag, that is pre-associated with the created I/O queue used to send the I/O request from the initiator to the storage target device, and that is decoded by an NVMe driver on the storage target device.

The identifying information may be determined, e.g., identified, from the I/O request by performing known techniques for parsing an I/O request for predetermined types of information, e.g., such as an I/O queue ID specified in the I/O request. A known type of decoding may be performed in some approaches to condition the information of the I/O request for such parsing.

The identifying information is mapped, e.g., using the logical map, to handshake hinting information for a respective host NQN in order to determine whether the I/O request was sent from the initiator to the storage target device using one of the created I/O queues. In one preferred approach, using the identifying information to determine whether the I/O request was sent from the initiator to the storage target device using one of the created I/O queues may include accessing the logical map and determining whether the identifying information of the I/O request maps to one of the created I/O queues. For example, assuming that the plurality of created I/O queues includes a first I/O queue, a second I/O queue, and a third I/O queue, and assuming that the identifying information of the I/O request specifies an ID of a fourth I/O queue, it may be determined that the identifying information of the I/O request does not map to one of the created I/O queues. In another approach, where the identifying information of the I/O request is an NQN, the logical map may be used to determine an I/O queue ID that is pre-associated with the I/O request. In such an approach, once the I/O queue ID is determined using the NQN, it may be determined whether the I/O queue ID matches an I/O queue ID of one of the created I/O queues. In response to a determination that the ID of the I/O request does not match an ID of one of created I/O queues, it may be concluded that the I/O request was not sent using one of the created I/O queues. However, in response to a determination that the ID of the I/O request matches an ID of one of created I/O queues, it may be concluded that the I/O request was sent using one of the created I/O queues.

In response to a determination that the I/O request was not sent from the initiator to the storage target device using one of the plurality of I/O queues (e.g., as illustrated by the "I/O request sent using another I/O queue" logical path of decision 508), a tiering manager of the storage target device may optionally be instructed to bypass tiering check logic and/or special processing described elsewhere herein, e.g., see operation 512 of method 500, with respect to operation(s) performed for I/O requests that are determined to have been sent from the a determination that initiator to the storage target device using one of the plurality of created I/O queues, e.g., see operation 510 of method 500. In other words, in response to a determination that the I/O request is sent using a normal I/O transmission carrier queue, the tiering manager of the storage target device may be optionally instructed to bypass the tiering check logic and/or special processing described elsewhere herein. In some approaches a nominal amount of adjustment may be performed on priority metric in response to a determination that the I/O request was not sent from the initiator to the storage target device using one of the plurality of I/O queues, e.g., such as adding one to a count of an extent heat map that is applied by a tiering management controller for moving data among tiers at the end of a tiering cycle.

In response to a determination that the I/O request was sent from the initiator to the storage target device using a first of the created I/O queues having one of the adjustments associated therewith (e.g., as illustrated by the "I/O request sent using a first of the created I/O queues" logical path of decision 508), a tiering manager of the storage target device is instructed to perform an adjustment on a current priority of an extent of data associated with the I/O request (e.g., hereafter referred to as a "first extent of data"), e.g., see operation 512 of method 500. In contrast to the example described elsewhere above, it may be determined that the identifying information of the I/O request maps to one of the created I/O queues where it is determined that the plurality of created I/O queues includes a first I/O queue, a second I/O queue, and a third I/O queue, and a determination that the identifying information of the I/O request specifies an ID of the first I/O queue. Note that in such an example, based on the identifying information of the I/O request alternatively specifying an ID of the second I/O queue or alternatively the third I/O queue, it may be determined that the identifying information maps to one of the created I/O queues. Accordingly, it may be determined that the I/O request was sent from the initiator to the storage target device using the first of the created I/O queues in response to a determination that the identifying information of the I/O request maps to the first of the created I/O queues.

In order to instruct the tiering manager of the storage target device to perform an adjustment on a current priority of an extent of data associated with the I/O request, the type of I/O queue, e.g., demotion, promotion, special weightage, etc., that was used to send the I/O request may be determined. As mentioned elsewhere above, characteristics of the logical map and/or the instructions for the tiering manager may indicate how to adjust current priorities of extents of data associated with I/O requests sent using one of the created I/O queues. Accordingly, the logical map may be accessed to determine the instructions for the tiering manager. Various different examples of priority adjustments that instructions for the tiering manager may be based on are described below.

In one approach, the adjustment may include promoting the first extent of data to a higher storage tier of the tiered data storage pool than a storage tier that the first extent of data is currently assigned to, e.g., in response to a determination that the I/O request was sent using one of the created I/O queues reserved for sending promotion-based I/O requests from the initiator to the storage target device. Note that the higher storage tier has relatively higher performing storage media than storage media of the tier of the tiered data storage pool that the first extent of data is currently assigned to and promoted from, and therefore, as a result of the adjustment, the first extent of data is relatively more readily available for accessing in an anticipated access request that the I/O request may be based on.

The adjustment may also be used to free up costlier faster tier space, e.g., such as in response to a determination that an extent access by an application is completed. This provides application driven performance benefits for faster data access with low latency with extent movement in faster tier storage. Moreover in-band tagging of data to facilitate demotion into slower tier space when applications do not call for extents of data, and software defined techniques that achieve performance benefits via in-band approaches of utilizing existing NVMe I/O queue architecture are enabled as a result of the adjustments including demotions of data in the tiered data storage pool. For example, in some approach, the adjustment may include demoting the first extent of data to a lower storage tier of the tiered data storage pool than the storage tier that the first extent of data is currently assigned to. Note that the lower storage tier has relatively lower performing storage media than storage media of the tier of the tiered data storage pool that the first extent of data is currently assigned to and demoted from, and therefore higher performing resources of the higher storage tier are freed-up for other data to be promoted to. The characteristics of the logical map and/or the instructions for the tiering manager may additionally and/or alternatively specify amounts to adjust the current priorities of extents of data associated with I/O requests sent using one of the created I/O queues, e.g., promoting the first I/O request one tier of the tiered data storage pool, promoting the first I/O request two storage tiers of the tiered data storage pool, promoting the first I/O request three storage tiers of the tiered data storage pool, promoting the first I/O request multiple storage tiers of the tiered data storage pool, demoting the first I/O request one storage tier of the tiered data storage pool, demoting the first I/O request two storage tiers of the tiered data storage pool, demoting the first I/O request three storage tiers of the tiered data storage pool, demoting the first I/O request multiple storage tiers of the tiered data storage pool, etc. Accordingly, the tiering manager of the storage target device may be instructed to perform an adjustment on the current priority of the first extent of data according to a type of adjustment, e.g., promotion, demotion, etc., as determined to be specified in the logical map and/or an amount of adjustment, e.g., one storage tier, multiple storage tiers, etc., as determined using the logical map.

In some other approaches, the adjustment may include updating a current tiering weightage of a heat map of the tiered data storage pool. According to some specific approaches, updating a current tiering weightage of a heat map of the tiered data storage pool may include applying a static counter multiplier, adding weight, reducing weight, e.g., such as by applying a ratio, applying a dynamic multiplier, etc., to the current tiering weightage of the first extent of data in the heat map. The characteristics of the logical map and/or the instructions for the tiering manager may additionally and/or alternatively specify amounts to adjust the a current tiering weightage of the heat map of the tiered data storage pool for extents of data associated with I/O requests sent using one of the created I/O queues. For example, the instruction to the tiering manager may specify a numerical count and/or a numerical multiplier to apply to, e.g., paste in, inject, modify an existing value, be averaged with an existing value, etc., in a current heat extent of the priority of the first extent of data for performing the adjustment. Note that in some approaches the adjustment may be injected out of a current tiering cycle such that the priority may be adjusted before a predetermined tiering cycle ends.

In some approaches, the tiering manager of the storage target device may only be instructed to perform the adjustment on the current priority of the first extent of data in response to a determination that a predetermined tiering threshold of the logical map is met. Accordingly, an optional operation of method 500 includes collection of tiering thresholds from the logical map and incorporating the tiering thresholds into decisions of whether to instruct the tiering manager of the storage target device to perform an adjustment. Various examples of tiering thresholds that may be incorporated into such decisions includes, e.g., a predetermined number of prior access requests for an extent of data being made within a predetermined amount of time by an application from which the I/O request originates, a predetermined number of prior access requests for the first extent of data being made by any application within a predetermined amount of time, the first extent of data being at least a predetermined size, the first extent of data including a predetermined type of data, etc.

The tiering manager may perform a tiering adjustment action in response to receiving the instruction and/or in response to the current priority of an extent of data being adjusted, e.g., promoting the extent of data to a higher tier, demoting the extent of data to a lower tier, modifying a heat map, deleting data, duplicating data in different tiers, etc.

In some approaches, an optional operation of method 500 includes fulfilling the I/O request sent from the initiator to the storage target device, e.g., performing a read operation on an extent of data associated with the I/O request, performing a write operation on an extent of data associated with the I/O request, performing a delete operation on an extent of data associated with the I/O request, etc. Accordingly, in some approaches, the I/O request may be sent from the initiator to the storage target device in order to cause an adjustment of a current priority of an extent of data associated with the I/O request, and moreover to have a data operation fulfilled. In some approaches, there may be no prior access history, e.g., determined user access history, of the extent of data associated with the I/O request. However, the I/O request may be sent from the initiator to the storage target device in order to cause an adjustment of a current priority of the extent of data associated with the I/O request based on a determination that an application from which the I/O request originates is associated with a relatively heightened degree of predetermined priority, e.g., the extent of data is owned by a predetermined customer application that pays relatively more for the storage, the extent of data is requested by a predetermined customer application that pays relatively more for the storage, etc.

Various performance benefits are enabled as a direct result of utilizing the plurality of created I/O between an initiator and a storage target device according to the techniques of one or more approaches described herein. For example, application performance is improved as a result of using various techniques described herein, as application requested data is moved to faster performing tier when the data is in demand. Accordingly, applications accessing these extents of data are able to utilize the I/O performance benefits of data accessing components, e.g., particularly SSD in some approaches, of the faster performing tier. This improves performance of the data system as a whole because extents of data that are moved to the faster performing tier would have otherwise been accessed from a relatively lower performing tier without the intimation of the I/O requests sent from the initiator to the target using one of the created I/O queues. Moreover, because in some approaches, applications are able to hint, e.g., by utilizing one of the created I/O queues that are reserved for I/O requests for which adjustments of current priorities of extents of data associated with the I/O requests are to be performed, the storage controller about which data is useful in near future, the relatively costlier SSD resources are utilized relatively more effectively than if tiering priority did not incorporate such hints. Furthermore, the techniques of various embodiments and approaches described herein provides a capability by which an application or host can instruct a storage controller to place certain data directly to slower tier disk space, which results into software defined techniques to tag data that is used for backup purposes. Various techniques described herein also enable an effective solution to use the existing NVMe I/O queue architecture, which is a lightweight protocol and hence, improved performance in message exchange is also achieved. Moreover, an efficient way to communicate with the storage target is provided using an in-band approach of NVMe I/O queues that are relatively easy to maintain and consume less processing when compared to other out-of-band approaches described elsewhere herein. These performance improvements and reductions in processing are also enabled by using the in-band approach to provide inputs to the tiering daemon at the storage site from host site, which results in high application performance as extents of data are more quickly accessible in the higher storage tiers. Selective extent heat is also capable of being managed using the selective I/O queues which provides cloud enablement to the storage controller wherein multiple dissimilar applications are accessing same data with different price-performance characteristics. Accordingly, various techniques described herein also include a potential for incorporating IP reservation. It should also be noted that various techniques described herein also do not have any extraordinary hardware and software requirements, and hence can be easily implemented within current storage system architecture via modifications thereof, thereby serving as a real-time problem solution for NVMe based storage systems.

Figure 6A:
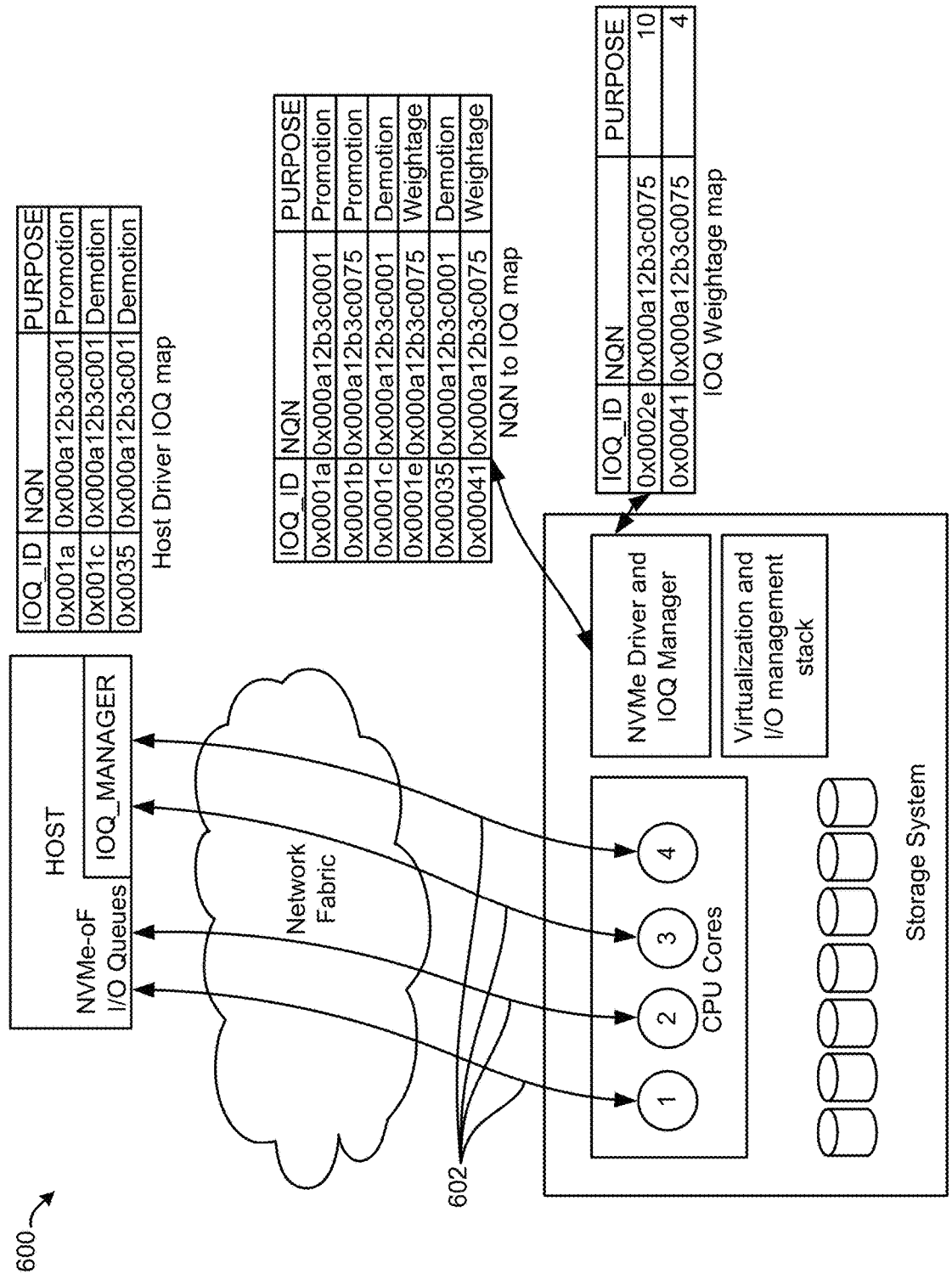
FIG. 6A is an architecture of a data storage environment, in accordance with one embodiment.
Figure 6B:
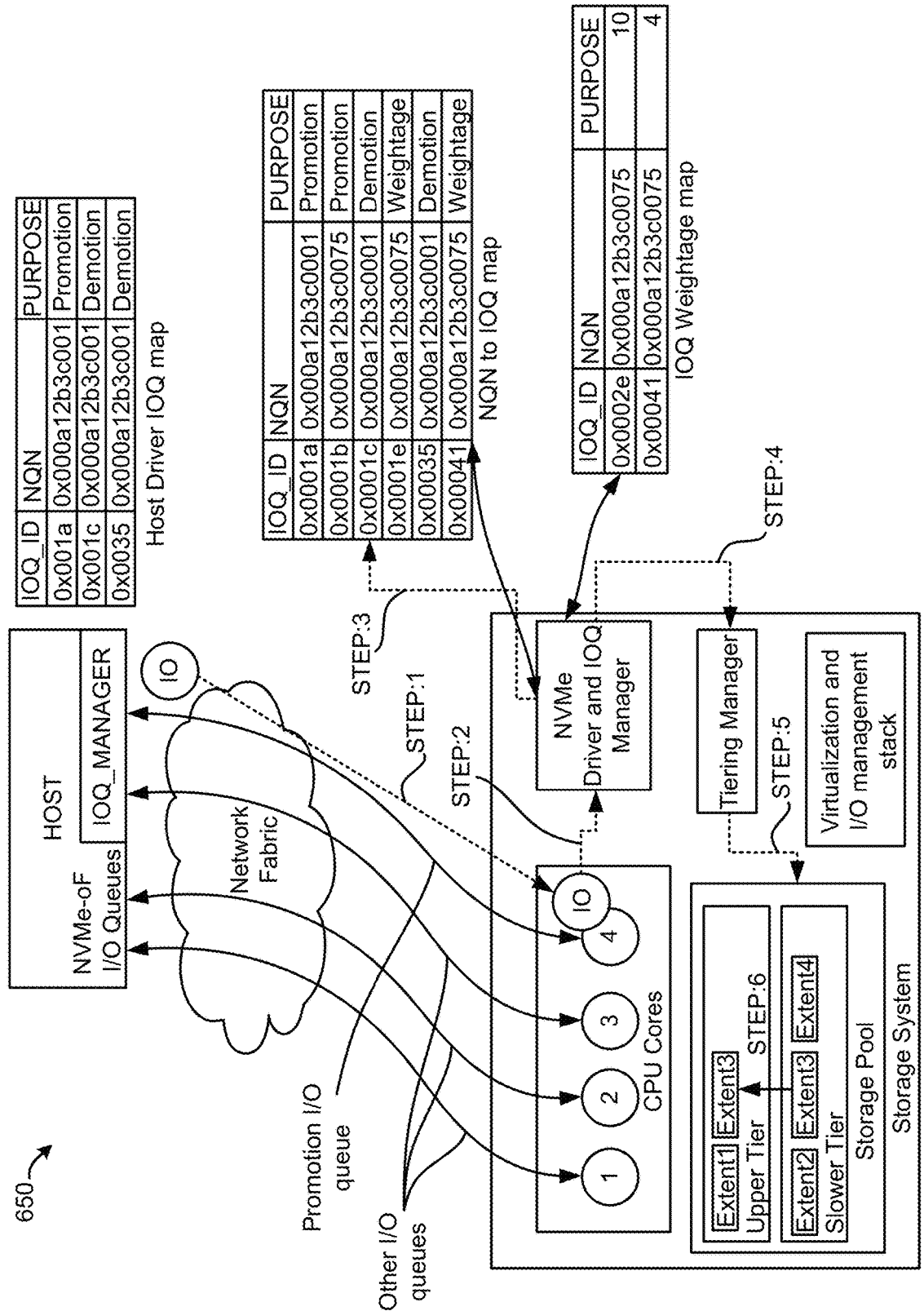
FIG. 6B is an architecture of a data storage environment, in accordance with one embodiment.

FIGS. 6A-6B depict architectures 600, 650 of data storage environments, in accordance with various embodiments. As an option, the present architectures 600, 650 may be implemented in conjunction with features from any other embodiment listed herein, such as those described with reference to the other FIGS. Of course, however, such architectures 600, 650 and others presented herein may be used in various applications and/or in permutations which may or may not be specifically described in the illustrative embodiments listed herein. Further, the architectures 600, 650 presented herein may be used in any desired environment.

Referring first to FIG. 6A, architecture 600 includes a plurality of special-purpose NVMe I/O queues 602 created between an initiator, e.g., see HOST, and a storage target device, e.g., see Storage System, via a network, e.g., see Network Fabric, between an I/O queue manager of the host and CPU cores of the storage target device, e.g., IOQ MANAGER and CPU Cores 1-4. The created I/O queues 602 are reserved for I/O requests for which adjustments of current priorities of extents of data associated with the I/O requests are to be performed. The created I/O queues are preferably maintained as special-purpose I/O queues to hint storage tiering movement. A logical map of special-purpose I/O queues is in some approaches maintained as promotion, demotion and weightage selected I/O queues, e.g., using <I/O Queue_ID, NQN> tuple. Moreover, an I/O queue may be identified from each I/O request that is sent from initiator device using one or more logical maps, e.g., see NQN to IOQ map and IOQ Weightage map, while the I/O request may be based on a logical map of the initiator, e.g., see Host Driver IOQ map, that has at least some common entries as the one or more logical maps of the storage target device. The logical maps may in some approaches identify the created I/O queues and a plurality of characteristics, e.g., such as parameters negotiated between the host and the storage target device. In some approaches, at a time that an I/O queue create request is received at the storage target device, a daemon at the host layer may determine the purpose of the I/O queue based on requirements and accordingly update the I/O queue logical map which may be maintained at a NVMe driver of the storage target device. The host daemon and NVMe driver preferably keeps the information about the characteristics of each I/O queue created between the host and storage target device that will be further used to send the special data over the created queues. The characteristics may also be stored in the logical maps maintained at the storage target device, e.g., the NQN to IOQ map and the IOQ Weightage map. Note that tiering check logic and special processing may be bypassed if the I/O request is determined to not belong to one of the special-purpose designated I/O queues.

A thin software layer may be implemented at the initiator's NVMe drive that includes initiation and maintenance of the special-purpose I/O queues. At least one of the created special-purpose I/O queues may include one or more special-purpose HINTING_IOQs with the storage target and information handshaking for specialized tiering roles of NVMe IO Queue. Moreover, the logical mapping of special-purpose I/O queues with the storage target may be created in the thin software layer.

Architecture 600 is further configured to select an I/O queue based on application suggestion of future data usage. User information, such as user I/O access patterns, may be collected by an NVMe driver at the host layer for future use of data and process the same with selection of an I/O queue. In response to a determination that data will be accessed in near future, e.g., within a predetermined amount of time, the information is collected by NVMe driver and incorporated into an I/O request that is send to the target via one of the I/O queues, e.g., one of the I/O queues that is reserved for promotion based I/O requests. There may be a selection of a demotion I/O queue in response to a determination that the data will no longer be accessed by host application, and as a result the one of the demotion I/O queues will be invoked for sending the I/O request to the target.

Architecture 600 also may include logic that is configured to select a special-weightage I/O queues in the NVMe driver based on one or more application requirements and send the data using the I/O queue to increment access heat counters by a specified amount, e.g., a relative amount that correlates to a determined need of the application for the extent of data. A counter may be selected by the application and the heat count may be sent with the data over one of the special I/O queues. A static multiplier may be utilized for certain I/O queues in the storage system for simpler applications and an assignment of I/O queues to these applications at host layer may be made to gain the benefits of the adjustments that occur to extent priorities as a result of application of the static multiplier.

Identifying information, e.g., I/OQ_ID, may be determined on each I/O request at the storage layer, and instructions may be sent to the tiering manager. Selection of an extent may be made based on an I/O queue for promotion, where a data access request is made via the promotion queue. The extent may be demoted where the access is made via demotion queue. Tiering weightage adjustments may also be identified and a heat map may be updated accordingly. A static counter multiplier validation from the logical map, e.g., IOQ MAP, and execution of access counter update is also enabled in the architecture 600. Dynamic multiplier parsing may also be performed from the I/O queue data, and map updates may be monitored for.

Injection of a tiering cycle may occur where the hinting candidates match the requirements for promotion or demotion. A mechanism of architecture 600 may be configured for selection of the extents for promotion overriding by the I/O queue's decisions to existing access counter maps. Moreover, a mechanism of architecture 600 may be configured for collection of tiering thresholds from the IOQ MAP and incorporating the thresholds into decisions for moving extents of data among tiers. A mechanism of architecture 600 may additionally and/or alternatively be configured for multi-level demotion of the extent in case requested by application over using one of the created I/O queues.

According to some examples, in response to a data READ/WRITE request being detected by the NVMe target driver from one of the special-purpose I/O queues, tiering function calls may be made with respective information which will be used at the tiering manager and heat map overriding for extent movement across the tiers. An in-band signal is made to the tiering demon using existing message queue architecture in the storage system indicating I/O command reception from one of the special-purpose I/O queues with the extent and Logical Block Addressing (LBA) locations with actions.

In response to this, the tiering manager may collect the data form NVMe controller, and I/O queue information may be parsed and accordingly the extent placement decisions are made. For example, in response to a determination that the I/O request is sent using the promotion I/O queue, and the I/O queue has permission to move the extent to faster tier, a tiering cycle may be injected to move the respective extent to a faster performing tier. In contrast, in response to a determination that the I/O request is sent using a weightage I/O queue, e.g., the I/O request is for special heat injection for the specific data, e.g., such as extent 0x00002234A9 by 10, then the extent heat of this extent will be increased or decreased by 10, which may result in the data being moved to a tier in accordance with an expected future usage of the data. These migrations improve performance experience within the data storage system as the data is served from faster performing tier. Before creating the special-purpose hinting I/O queues between the initiator and the target, an additional authentication and storage authorization handshake mechanism may be implemented at the host entity to support special-purpose I/O requests and queues, as such I/O requests affect the tiering placement at the storage target. In some approaches, to achieve equilibrium, use of such queues may be allowed to only predetermined customer applications that pay more for the storage, e.g., as part of a cost plan. This may be easily performed by integrating existing access policies, e.g., such as Object Based Access Control in SVC, in the storage controllers to avoid starvation of other applications.

Referring now to FIG. 6B, architecture 650 includes a plurality of special-purpose NVMe I/O queues, e.g., Promotion I/O queue and Other I/O queues, created between an initiator, e.g., see HOST, and a storage target device, e.g., see Storage System. The created I/O queues are reserved for I/O requests for which adjustments of current priorities of extents of data, e.g., data of a tiered data Storage Pool of the target storage device, associated with the I/O requests are to be performed. The created I/O queues are preferably maintained as special-purpose I/O queues to hint storage tiering movement. Various operational steps for using the created I/O queues for sending I/O requests to adjust a current priority of extents of data stored in the tiered data storage pool of the storage target device will now be described below in accordance with various approaches, e.g., see STEP 1-STEP 5.

STEP 1 includes an I/O request being sent from the host site to the storage target device using the Promotion I/O queue. Identifying information, of the I/O request is determined in STEP 2. It is determined, using the identifying information, whether the I/O request was sent from the initiator to the storage target device using any of the created I/O queues, e.g., see STEP 3. Note that the logical map, e.g., see NQN to IOQ map, may be used in making such a determination. In response to a determination that the I/O request was sent from the initiator to the storage target device using one of the created I/O queues, the tiering manager of the storage target device is instructed to perform an adjustment on a current priority of an extent of data associated with the I/O request sent from the initiator to the storage target device using one of the created I/O queues, e.g., see STEP 4. STEP 5 shows the tiering manager moving Extent3 in response to receiving such an instruction.

It may be noted that although each of the I/O queue IDs, e.g., IOQ_ID, and NQN values of the Host Driver IOQ mapping are present in the NQN to IOQ map, some of the IOQ_ID and NQN values present in the NQN to IOQ map are not present in the Host Driver IOQ mapping, e.g., see IOQ_IDs 0x0001b, 0x0001e, 0x00041 and associated NQN values not present in the Host Driver IOQ mapping. This is because although only one host is illustrated in architecture 650, more than one host may optionally be connected to the same target. Accordingly, the IOQ_IDs 0x0001b, 0x0001e, 0x00041 and associated NQN values located in the NQN to IOQ map correspond to another host (not shown) that may be connected to the target, e.g., where a different set of created I/O queues that are reserved for sending second I/O requests from a second initiator. Note that the second I/O requests may be sent from the second initiator in order to initiate adjustments of current priorities of extents of data associated with the I/O requests of the second initiator.

Figure 7A:
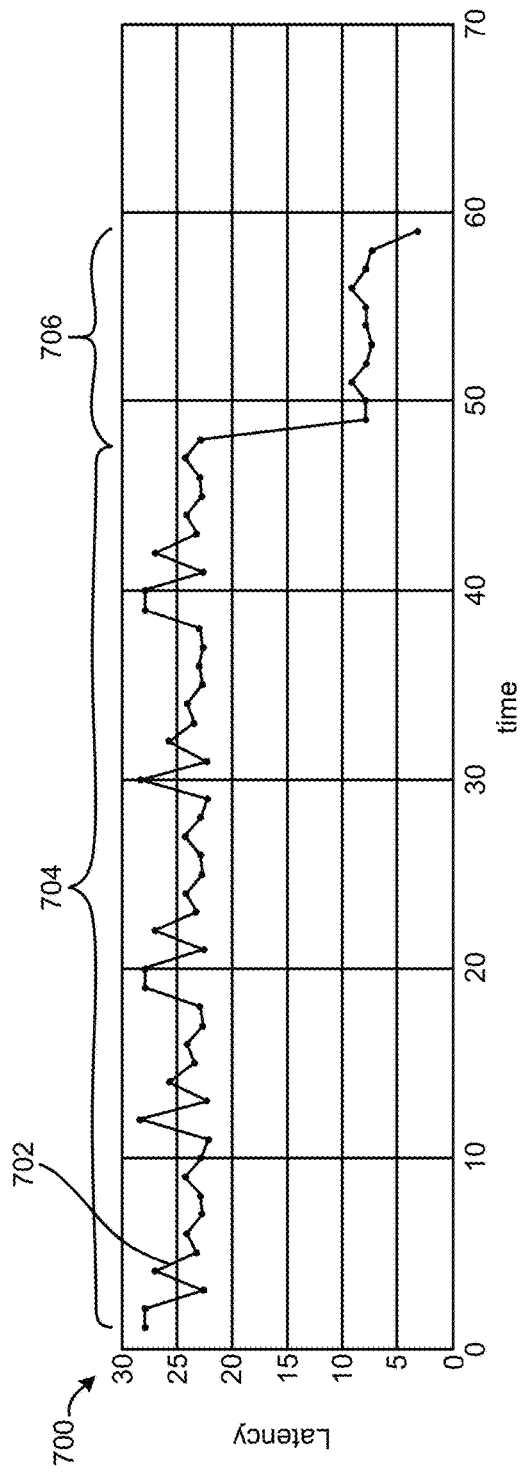
FIG. 7A is a plot that illustrates a linear representation of latency over time when I/O queues are not reserved for I/O requests for which adjustments of current priorities of extents of data associated with the I/O requests are to be performed, in accordance with one embodiment.
Figure 7B:
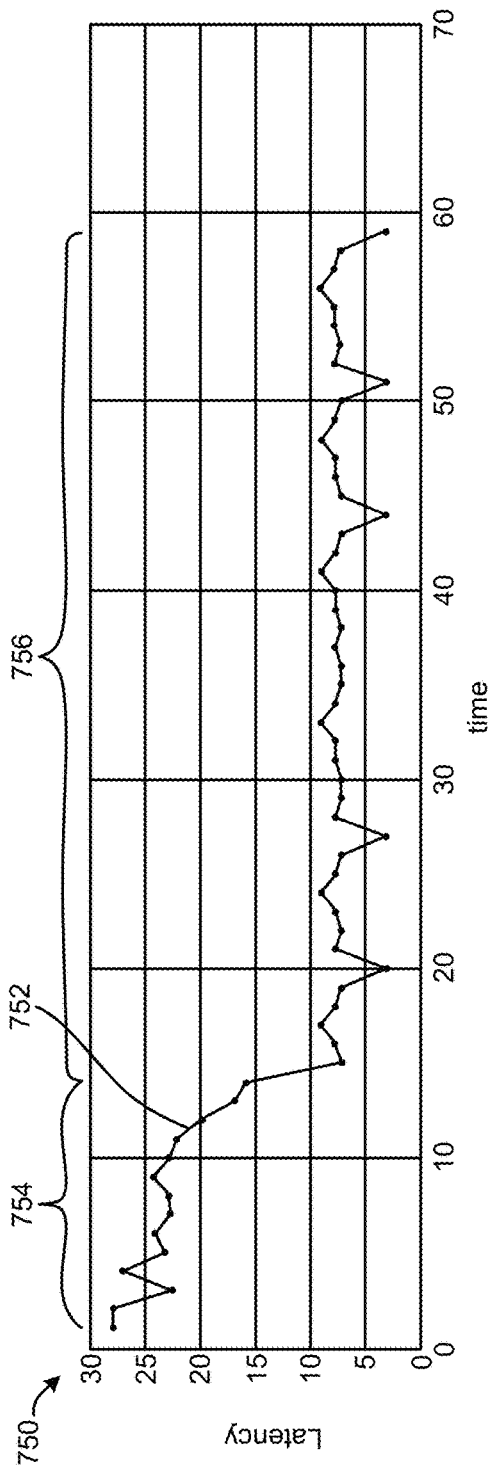
FIG. 7B is a plot that illustrates a linear representation of latency over time when I/O queues are reserved for I/O requests for which adjustments of current priorities of extents of data associated with the I/O requests are to be performed, in accordance with one embodiment.

FIGS. 7A-7B depict plots 700, 750, in accordance with various embodiments. As an option, the present plots 700, 750 may be implemented in conjunction with features from any other embodiment listed herein, such as those described with reference to the other FIGS. Of course, however, such plots 700, 750 and others presented herein may be used in various applications and/or in permutations which may or may not be specifically described in the illustrative embodiments listed herein. Further, the plots 700, 750 presented herein may be used in any desired environment.

Referring first to FIG. 7A, plot 700 illustrates a linear representation 702 of latency over time when I/O queues are not reserved for I/O requests for which adjustments of current priorities of extents of data associated with the I/O requests are to be performed. Data access latency experienced in a first time period 704 is relatively greater than data access latency experienced in a second time period 706 thereafter. The relatively lower amount of experienced latency in the second time period results from an extent of data that is accessed relatively frequently from a relatively lower performing storage tier, e.g., using HDD, in the first time period 704 being migrated to a relatively higher performing storage tier, e.g., using SSD, in the second time period 706.

Referring next to FIG. 7B, plot 750 illustrates a linear representation 752 of latency over time when I/O queues are reserved for I/O requests for which adjustments of current priorities of extents of data associated with the I/O requests are to be performed, e.g., special-purpose hinting NVMe I/O queues. Data access latency experienced in a first time period 754 is relatively greater than data access latency experienced in a second time period 756 thereafter. The relatively lower amount of experienced latency in the second time period results from an extent of data that is accessed relatively frequently from a relatively lower performing storage tier, e.g., using HDD, in the first time period 754 being migrated to a relatively higher performing storage tier, e.g., using SSD, in the second time period 756. When plot 700 is contrasted with plot 750 the benefits of techniques described herein for using special-purpose hinting NVMe I/O queues are realized. For example, plot 750 illustrates that frequently accessed data is migrated from lower performing storage tiers to higher performing storage tiers relatively more quickly as a result of using special-purpose hinting NVMe I/O queues than would otherwise result without using special-purpose hinting NVMe I/O queues, e.g., see plot 700. More specifically, as a result of extents of data being proactively moved among tiers of a tiered data storage pool of a storage target device using hinting NVMe I/O queues, the extents of data reach higher performing storage tiers with additional tiering cycle injection and application relatively earlier, which results in processing improvements to the data storage system.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special-purpose hardware-based systems that perform the specified functions or acts or carry out combinations of special-purpose hardware and computer instructions.

Moreover, a system according to various embodiments may include a processor and logic integrated with and/or executable by the processor, the logic being configured to perform one or more of the process steps recited herein. The processor may be of any configuration as described herein, such as a discrete processor or a processing circuit that includes many components such as processing hardware, memory, I/O interfaces, etc. By integrated with, what is meant is that the processor has logic embedded therewith as hardware logic, such as an application specific integrated circuit (ASIC), a FPGA, etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising:
causing a plurality of nonvolatile memory express (NVMe) I/O queues to be created between an initiator and a storage target device,
wherein a first subset of the created I/O queues are priority adjustment I/O queues that are reserved for I/O requests for which adjustments of current priorities of extents of data associated with the I/O requests are to be performed,
wherein the adjustments are based on anticipated demand(s) and/or anticipated lack of demand(s), in a predetermined future period of time, for the extents of data associated with the I/O requests,
wherein a second subset of the created I/O queues are used for I/O requests for regular I/O operations, the I/O queues in the second subset being different than the I/O queues in the first subset;
determining identifying information of an I/O request sent from the initiator to the storage target device,
wherein the I/O request is sent from the initiator to the storage target device using an in-band protocol command in which direct communication occurs between the initiator and the storage target device;
determining, using the identifying information, whether the I/O request was sent from the initiator to the storage target device using only one of the created priority adjustment I/O queues and none of the other created I/O queues; and
in response to a determination that the I/O request was sent from the initiator to the storage target device using only a first of the created priority adjustment I/O queues and none of the other created I/O queues, having one of the adjustments associated therewith, instructing a tiering manager of the storage target device to perform the adjustment on the current priority of the extent of data associated with the I/O request,
wherein the instruction to the tiering manager specifies a numerical multiplier to apply to a current heat extent of the current priority of the extent of data.

2. The computer-implemented method as recited in claim 1, comprising: causing a logical map to be created, wherein the logical map identifies the created priority adjustment I/O queues and a plurality of characteristics, wherein the characteristics indicate how to adjust the current priorities of extents of data associated with the I/O requests.

3. The computer-implemented method as recited in claim 2,
wherein determining, using the identifying information, whether the I/O request was sent from the initiator to the storage target device using only one of the created priority adjustment I/O queues and none of the other created I/O queues includes:
accessing the logical map, and
determining whether the identifying information of the I/O request maps to one of the created priority adjustment I/O queues,
wherein a determination is made that the I/O request was sent from the initiator to the storage target device using only the first of the created priority adjustment I/O queues and none of the other created I/O queues in response to a determination that the identifying information of the I/O request maps to the first of the created priority adjustment I/O queues.

4. The computer-implemented method as recited in claim 3, wherein the adjustment includes promoting the extent of data to a higher storage tier of a tiered data storage pool of the storage target device.

5. The computer-implemented method as recited in claim 4, wherein the extent of data is promoted multiple storage tiers of the tiered data storage pool during the promotion to the higher storage tier.

6. The computer-implemented method as recited in claim 3, wherein the adjustment includes updating a current tiering weightage of a heat map of a tiered data storage pool of the storage target device.

7. The computer-implemented method as recited in claim 6, wherein the instruction to the tiering manager specifies that the numerical multiplier be applied out of a current tiering cycle such that the priority is adjusted before a predetermined tiering cycle ends.

8. The computer-implemented method as recited in claim 1, wherein the identifying information indicates whether an application from which the I/O request originates is associated with a relatively heightened degree of predetermined priority, wherein the application is determined to be associated with the relatively heightened degree of predetermined priority in response to a determination that the application pays relatively more for storage than other applications, wherein the tiering manager is instructed to perform the adjustment by promoting the current priority of the extent of data associated with the I/O request in response to a determination that the application the application is associated with the relatively heightened degree of predetermined priority.

9. A computer program product, the computer program product comprising a computer readable storage medium having program instructions embodied therewith, the program instructions readable and/or executable by a computer to cause the computer to:
cause, by the computer, a plurality of nonvolatile memory express (NVMe) I/O queues to be created between an initiator and a storage target device,
wherein a first subset of the created I/O queues are priority adjustment I/O queues that are reserved for I/O requests for which adjustments of current priorities of extents of data associated with the I/O requests are to be performed,
wherein the adjustments are based on anticipated demand(s) and/or anticipated lack of demand(s), in a predetermined future period of time, for the extents of data associated with the I/O requests,
wherein a second subset of the created I/O queues are used for I/O requests for regular I/O operations, the I/O queues in the second subset being different than the I/O queues in the first subset;
determine, by the computer, identifying information of an I/O request sent from the initiator to the storage target device, wherein the I/O request is sent from the initiator to the storage target device using an in-band protocol command in which direct communication occurs between the initiator and the storage target device;

determine, by the computer, using the identifying information, whether the I/O request was sent from the initiator to the storage target device using only one of the created priority adjustment I/O queues and none of the other created I/O queues; and in response to a determination that the I/O request was sent from the initiator to the storage target device using only a first of the created priority adjustment I/O queues and none of the other created I/O queues, having one of the adjustments associated therewith, instruct, by the computer, a tiering manager of the storage target device to perform the adjustment on the current priority of the extent of data associated with the I/O request.

10. The computer program product as recited in claim 9, the program instructions readable and/or executable by the computer to cause the computer to: cause, by the computer, a logical map to be created, wherein the logical map identifies the created priority adjustment I/O queues and a plurality of characteristics, wherein the characteristics indicate how to adjust the current priorities of extents of data associated with the I/O requests.

11. The computer program product as recited in claim 10, wherein determining, using the identifying information, whether the I/O request was sent from the initiator to the storage target device using one of the created priority adjustment I/O queues includes:
accessing the logical map, and
determining whether the identifying information of the I/O request maps to one of the created priority adjustment I/O queues,
wherein a determination is made that the I/O request was sent from the initiator to the storage target device using the first of the created priority adjustment I/O queues in response to a determination that the identifying information of the I/O request maps to the first of the created priority adjustment I/O queues.

12. The computer program product as recited in claim 11, wherein the adjustment is selected from the group consisting of: promoting the extent of data to a higher storage tier of a tiered data storage pool of the storage target device, and demoting the extent of data to a lower storage tier of the tiered data storage pool.

13. The computer program product as recited in claim 11, wherein the adjustment includes demoting the extent of data to a lower storage tier of a tiered data storage pool of the storage target device, wherein the extent of data is demoted multiple storage tiers of the tiered data storage pool.

14. The computer program product as recited in claim 11, wherein the adjustment includes updating a current tiering weightage of a heat map of a tiered data storage pool of the storage target device.

15. The computer program product as recited in claim 14, wherein the instruction to the tiering manager specifies a numerical multiplier to apply to a current heat extent of the current priority of the extent of data, wherein the instruction to the tiering manager specifies that the numerical multiplier be applied out of a current tiering cycle such that the priority is adjusted before a predetermined tiering cycle ends.

16. The computer program product as recited in claim 9, wherein the identifying information indicates whether an application from which the I/O request originates is associated with a relatively heightened degree of predetermined priority, wherein the application is determined to be associated with the relatively heightened degree of predetermined priority in response to a determination that the application pays relatively more for storage than other applications, wherein the tiering manager is instructed to perform the adjustment by promoting the current priority of the extent of data associated with the I/O request in response to a determination that the application the application is associated with the relatively heightened degree of predetermined priority.

17. A system, comprising:
a processor; and
logic integrated with the processor, executable by the processor, or integrated with and executable by the processor, the logic being configured to:
cause a plurality of nonvolatile memory express (NVMe) I/O queues to be created between an initiator and a storage target device,
wherein a first subset of the created I/O queues are priority adjustment I/O queues that are reserved for I/O requests for which adjustments of current priorities of extents of data associated with the I/O requests are to be performed,
wherein the adjustments are based on anticipated demand(s) and/or anticipated lack of demand(s), in a predetermined future period of time, for the extents of data associated with the I/O requests,
wherein a second subset of the created I/O queues are used for sending regular operations from the initiator to the storage target device;
cause a logical map to be created,
wherein the logical map identifies the created priority adjustment I/O queues and a plurality of characteristics,
wherein the characteristics indicate how to adjust the current priorities of extents of data associated with the I/O requests,
determine identifying information of an I/O request sent from the initiator to the storage target device,
wherein the I/O request is sent from the initiator to the storage target device using an in-band protocol command in which direct communication occurs between the initiator and the storage target device;
determine, using the identifying information, whether the I/O request was sent from the initiator to the storage target device using one of the created priority adjustment I/O queues,
wherein determining, using the identifying information, whether the I/O request was sent from the initiator to the storage target device using one of the created priority adjustment I/O queues includes:
accessing the logical map, and
determining whether the identifying information of the I/O request maps to one of the created priority adjustment I/O queues,
wherein a determination is made that the I/O request was sent from the initiator to the storage target device using a first of the created priority adjustment I/O queues in response to a determination that the identifying information of the I/O request maps to the first of the created priority adjustment I/O queues; and
in response to a determination that the I/O request was sent from the initiator to the storage target device using the first of the created priority adjustment I/O queues having one of the adjustments associated therewith, instruct a tiering manager of the storage target device to perform the associated adjustment on the current priority of the extent of data associated with the I/O request.

18. The computer-implemented method as recited in claim 2, wherein each created priority adjustment I/O queue is associated with only one of the adjustments.

19. The computer-implemented method as recited in claim 18, wherein the adjustments include promotion and demotion, wherein created priority adjustment I/O queues that are associated with promotion adjustments are not used to send I/O requests associated with demotion adjustments, wherein created priority adjustment I/O queues that are associated with demotion adjustments are not used to send I/O requests associated with promotion adjustments.

20. The computer-implemented method as recited in claim 19, wherein the regular I/O requests are requests that are not associated with changes to current priorities of extents of data, wherein the instruction to the tiering manager specifies a numerical count to apply to the current heat extent of the current priority of the extent of data to perform the adjustment, wherein applying the numerical count to the current heat extent of the current priority of the extent of data includes averaging the numerical count with an existing value of the current heat extent of the current priority of the extent of data, wherein the tiering manager is only instructed to perform the adjustment in response to a determination that a predetermined tiering threshold of the logical map is met, wherein the predetermined tiering threshold is unique to an application from which the I/O request originates, wherein the predetermined tiering threshold specifies that the extent of data be at least a predetermined size and a predetermined type of data, and comprising: determining the anticipated demand(s) and/or anticipated lack of demand(s) in the predetermined future period of time, wherein the anticipated demand(s) and/or anticipated lack of demand(s) are determined based on past user information that is collected by an NVMe driver of a host site.

* * * * *